US000001499H

United States Statutory Invention Registration [19]

[11] Reg. Number: H1499

Vance

[45] Published: Nov. 7, 1995

[54] SLANTED BAFFLE MIST ELIMINATOR

[75] Inventor: Richard F. Vance, Orchard Park, N.Y.

[73] Assignee: The United States of America as represented by the Department of Energy, Washington, D.C.

[21] Appl. No.: 967,463

[22] Filed: Oct. 28, 1992

[51] Int. Cl.[6] ..... B01D 45/00

[52] U.S. Cl. ..... 55/446

[58] Field of Search ..... 55/442–447

[56] References Cited

U.S. PATENT DOCUMENTS

| | | | |
|---|---|---|---|
| 362,191 | 5/1887 | Stuart | 55/444 |
| 700,859 | 5/1902 | Thomas | 55/443 X |
| 852,122 | 4/1907 | Kinealy | 55/442 X |
| 885,185 | 4/1908 | Serrell | 55/446 X |
| 1,796,436 | 3/1931 | Bradshaw | 55/444 X |
| 1,825,274 | 9/1931 | Leach | 55/444 X |
| 2,054,124 | 9/1936 | Forbes, Jr. et al. | 55/444 X |
| 2,163,600 | 6/1939 | How | 55/444 |
| 2,656,824 | 10/1953 | Devaux | 55/145 X |
| 3,564,820 | 2/1971 | Nelson | 55/444 X |
| 4,283,209 | 8/1981 | Schmalhofer | 55/445 X |

FOREIGN PATENT DOCUMENTS

| | | | |
|---|---|---|---|
| 497497 | 9/1954 | Italy | 55/446 |
| 287984 | 4/1953 | Switzerland | 55/444 |
| 8752 | of 1909 | United Kingdom | 55/442 |

*Primary Examiner*—Donald P. Walsh
*Assistant Examiner*—Chrisman D. Carroll
*Attorney, Agent, or Firm*—Tyrone Davis; Thomas G. Anderson; William Moser

[57] ABSTRACT

An apparatus for the elimination of mist from off-gas during vitrification of nuclear waste, where baffles are installed on a slant toward the flow of the off-gasses eliminating the need to expand the cross-sectional area of the duct size.

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SLANTED BAFFLE MIST ELIMINATOR

CONTRACTUAL ORIGIN OF THE INVENTION

The United States Government has rights in this invention pursuant to Contract No. DE-AC07-81NE44139 between the United States Department of Energy and West Valley Nuclear Services.

BACKGROUND OF THE INVENTION

This invention relates to capture of entrained water droplets from off-gasses during vitrification process. Vitrification is the process of encapsulizing contaminate waste in glass for easier recovery and disposal during retrieval operations. The subject invention attaches to the process equipment to channel the off-gasses and to remove entrained water droplets.

Mist elimination technology now employed either requires large diameter ducting to account for the high flow rates, or a pad arrangement that frequently must be cleaned by flushing with water or other fluids. Size constraints limit the diameter of ducting that may be used and frequent flushing of water defeats the overall purpose to eliminate mist vapors. In the instant invention, a slanted single baffle arrangement eliminates the need for a large diameter duct. In addition, the shaped plates capture the mist droplets while allowing off-gasses and particulate matter to escape and either be removed or contained. The device and it's associated moisture collection box may be constructed of either a metal, glass, ceramic, or plastic material.

SUMMARY OF THE INVENTION

The invention relates to a slanted baffle for the removal of vapors during the vitrification of nuclear waste. When high level nuclear waste, in the form of aqueous sludge, is vitrified, various gasses including steam, are produced. The present invention removes the liquid mist allowing contaminate off-gasses to pass to a high efficiency particulate filter. The invention is an attachment to the flow ducting where baffles are installed on a slant of 45 degrees or greater toward the flow of the off-gasses eliminating the need to expand the duct size. The shape of the baffle channels can either be U or V-shaped. In addition, the slant of the baffles lead to a moisture collection port located in the duct walls. Moisture collection by impingement, on the slanted baffles is assisted by the flow of the off-gasses as they pass through the mist eliminator, thereby eliminating any reintrainment of the moisture. A collection box or drain tube is attached to the slanted baffle mist eliminator and with the assistance of gravity and the flow of the gasses, the moisture flows to a central collection point.

It is an object of this invention to provide a mist elimination device for use in the thermal process off-gas streams during nuclear waste vitrification.

It is another object of this invention to provide an entrained liquid droplet capture device which reduces the necessity for frequent cleaning.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise an apparatus for the elimination of mist during vitrification of nuclear waste where baffles are installed on a slant toward the flow of the off-gasses eliminating the need to expand the duct size.

BRIEF DESCRIPTION OF THE DRAWINGS

The accompanying drawings, which are incorporated in and form part of the specification, illustrate an embodiment of the of the present invention and together with the description, serve to explain the principles of the invention. In the drawings.

DETAILED DESCRIPTION OF THE INVENTION

Figure 1:
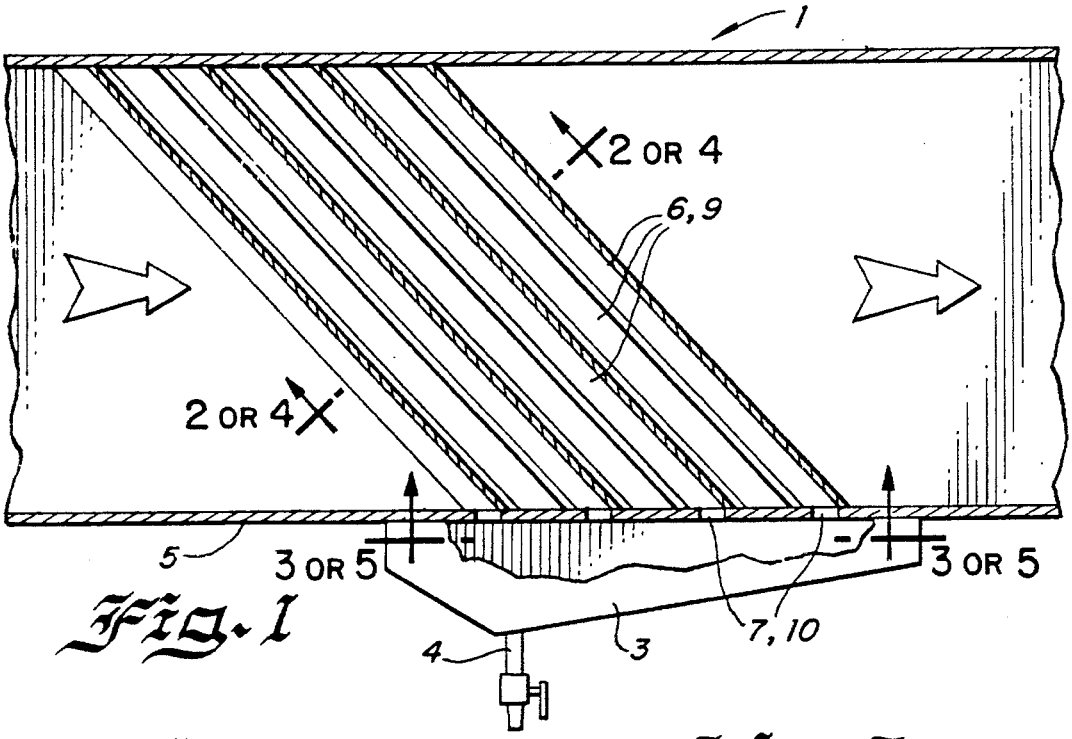
FIG. 1 is an embodiment of the invention having inverted v-shaped baffles including the collection box and port.
Figure 2:
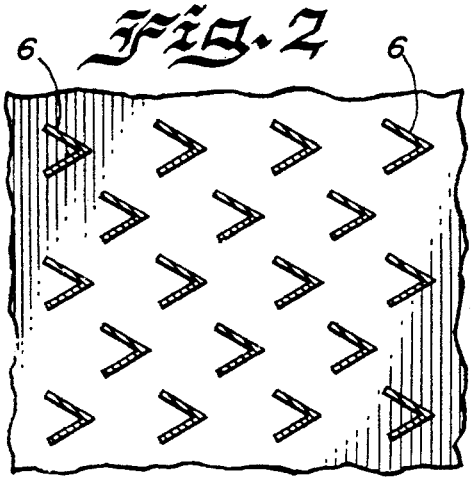
FIG. 2 is a section of the embodiment as shown in FIG. 1 taken at 2.

Referring to FIGS. 1 and 2, the mist eliminator 1 is installed in an exhaust duct 5. As the waste gas stream travels through the duct 5, it encounters slanted inverted v-shaped baffles 6. The frictional forces from the flow pushes the gas against the baffles 6, where the mist of the stream accumulates along the inverted "v" of the baffles 6 until gravity forces the collected mist to flow into the collection box 3 attached to the slanted baffle mist eliminator 1. Once the moisture is collected in the collection box 3 it can be drained through the drain 4.

Figure 3:
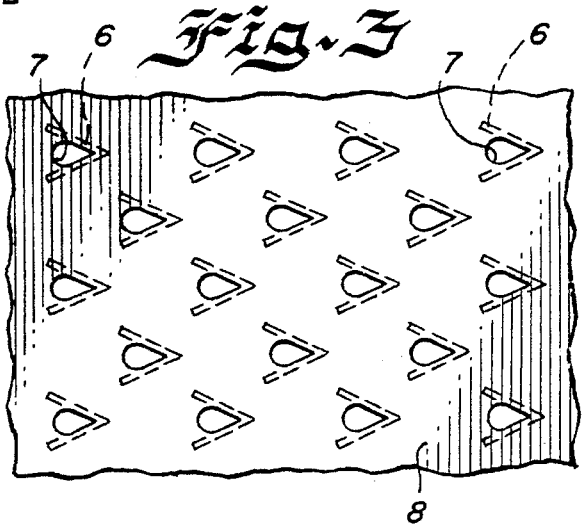
FIG. 3 is a section of the embodiment as shown in FIG. 1 taken at 3.
Figure 4:
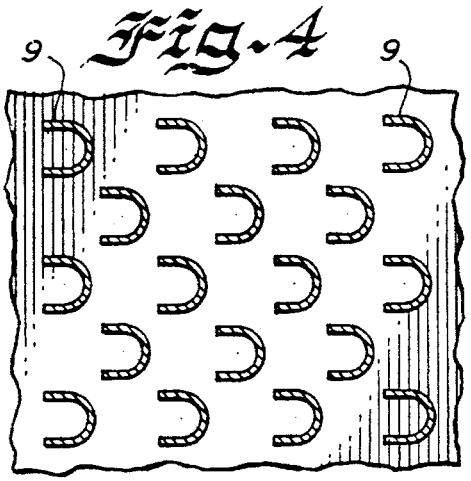
FIG. 4 is another embodiment of the invention having u-shaped baffles.
Figure 5:
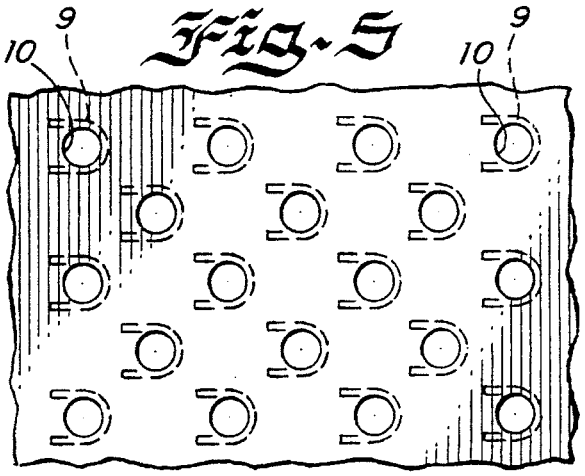
FIG. 5 is a section of the embodiment as shown in FIG. 4 taken at 5.
Figure 6:
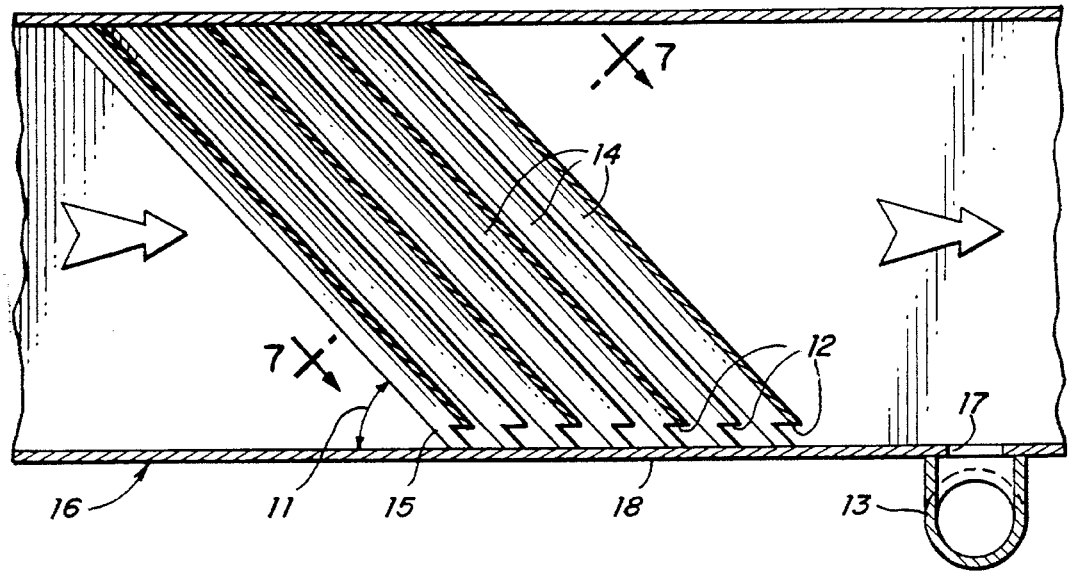
FIG. 6 is another embodiment of the invention having slotted u-shaped baffles.
Figure 7:
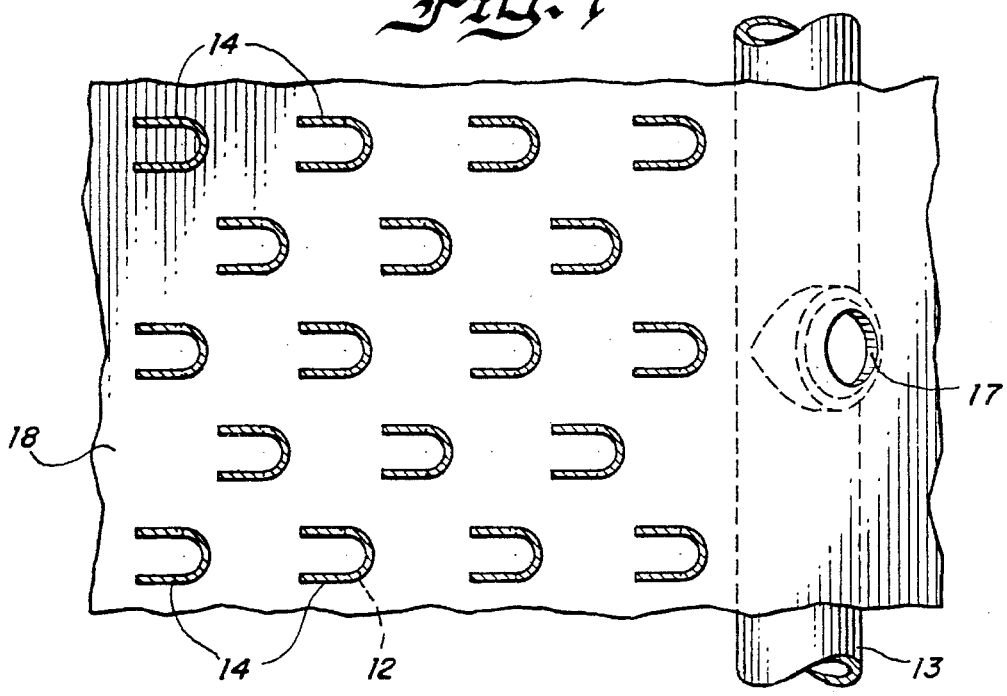
FIG. 7 is a section of the embodiment as shown in FIG. 6 taken at 7.

As shown in FIG. 3, orifices 7 matching the size and shape of the baffles 6 are cut into the side walls 8 of the exhaust duct 5, to minimize the build-up of suspended solids and clog the orifices 7. FIG. 4 shows an embodiment of the invention 9 with inverted u-shaped baffles 10. FIG. 5 is a section of the embodiment shown in FIG. 4 taken at 5. It shows the inverted u-shaped baffles 10 within a waste gas stream. FIGS. 6 and 7 show an embodiment of the invention for use where the collection box is inappropriate. The mist eliminator 16 includes u-shaped baffles 14. Each baffle 14 incorporates a slot 12 with an angle of incident 11 of 45° or greater. This allows the impinged liquid to collect at the base 15 of the baffle 14, and whereby the force of gravity and exhaust frictional forces to push the liquid through the slots 12 and onto the drain tube 13. The slots 12 cut into the baffles 14 allow the liquid to travel along the wall 18 of the mist eliminator 16 to the channel 17 and out the drain tube 13.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. An apparatus for the elimination of mist in off-gas during the vitrification of nuclear waste materials comprising:

a hollow tube having an inner and outer wall area;

a plurality of baffles having an inner surface, an outer surface, and a base end, disposed in said hollow tube at an angle at least 45° in the direction of said off-gas, and configured whereby when said off-gas pass said baffles said mist impinges on said inner surface of said baffles and with the assistance of gravity collects at said base of said baffles; and means for collecting said impinged mist along the inner wall area of said hollow tube.

2. The apparatus as recited in claim 1, wherein said baffles is selected from the group consisting of ceramic, glass, metal, and plastic materials.

3. The apparatus as recited in claim 2, wherein said means for collecting said mist consists of an orifice located at the base end of said baffles and said inner wall of said hollow tube, whereby a collection box is attached to the outer wall area of said hollow tube allowing said impinged mist to drain through said orifice and collect in said collection box until said impinged mist can be drained.

4. The apparatus as recited in claim 2, wherein said means for collecting said impinged mist consists of a slot cut into said baffles located at the base end of said baffles, and a drain cut into the inner wall area of said hollow tube, whereby said impinged mist collects at said base of said baffles and the frictional force of said off-gas push said impinged mist through said slot and out said drain.

5. The apparatus as recited in claim 4, wherein said means for collecting said impinged mist further comprises a channel in said inner wall area which directs said impinged mist to said drain.

6. The apparatus as recited in claim 5, wherein said baffles have an inverted u-shape.

7. The apparatus as recited in claim 3, wherein said baffles have an inverted u-shape.

8. The apparatus as recited in claim 5, wherein said baffles have an inverted v-shape.

9. The apparatus as recited in claim 3, wherein said baffles have an inverted v-shape.

10. The apparatus as recited in claim 1, wherein said tube is selected from the group consisting of ceramic, glass, metal, and plastic materials.

11. The apparatus as recited in claim 9, wherein said orifice is shaped corresponding to said baffles, thereby impeding the build-up of suspended solids from clogging said orifice.

* * * * *